INVENTOR
MARCUS W. HAGEN
BY
ATT'Y.

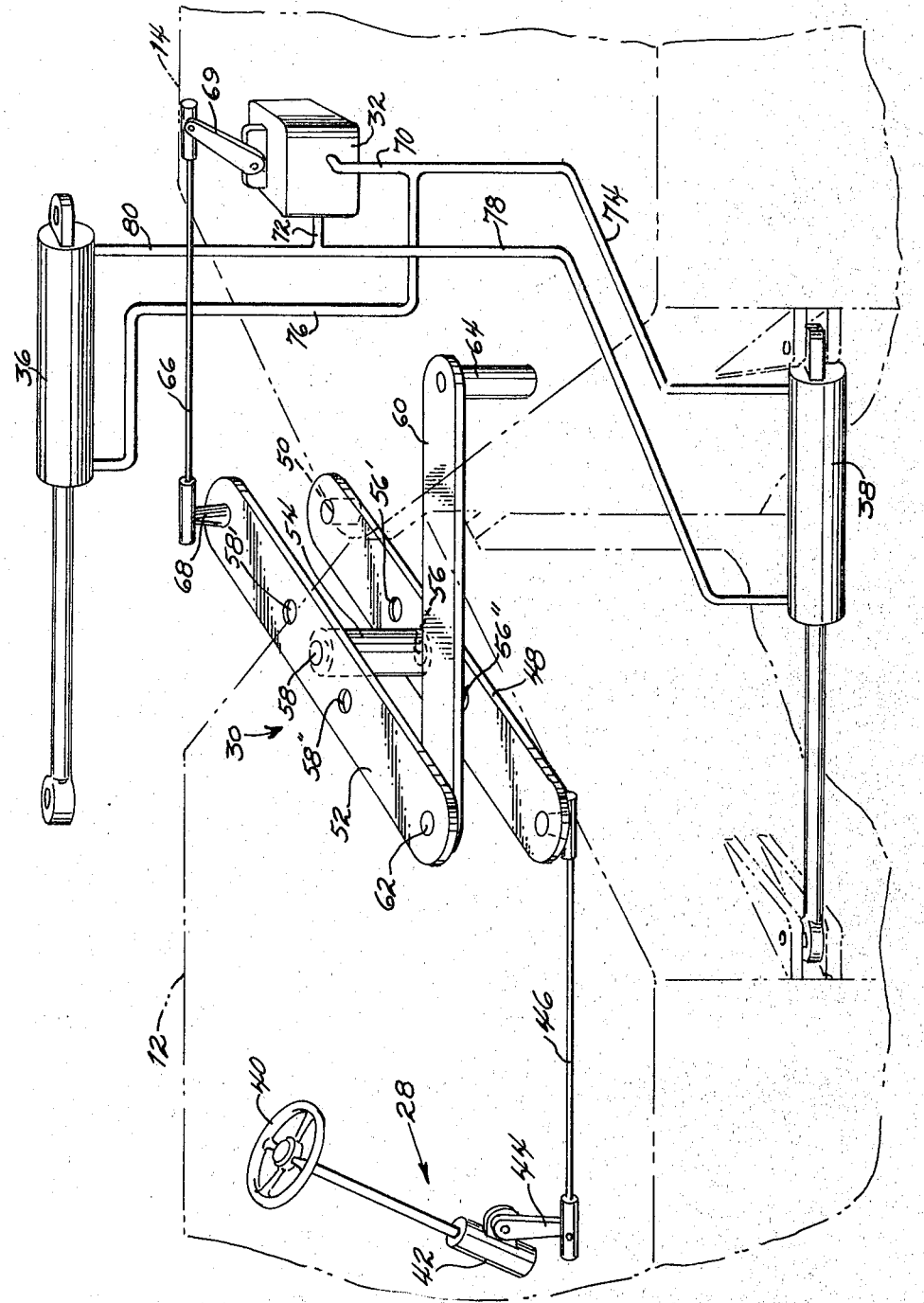

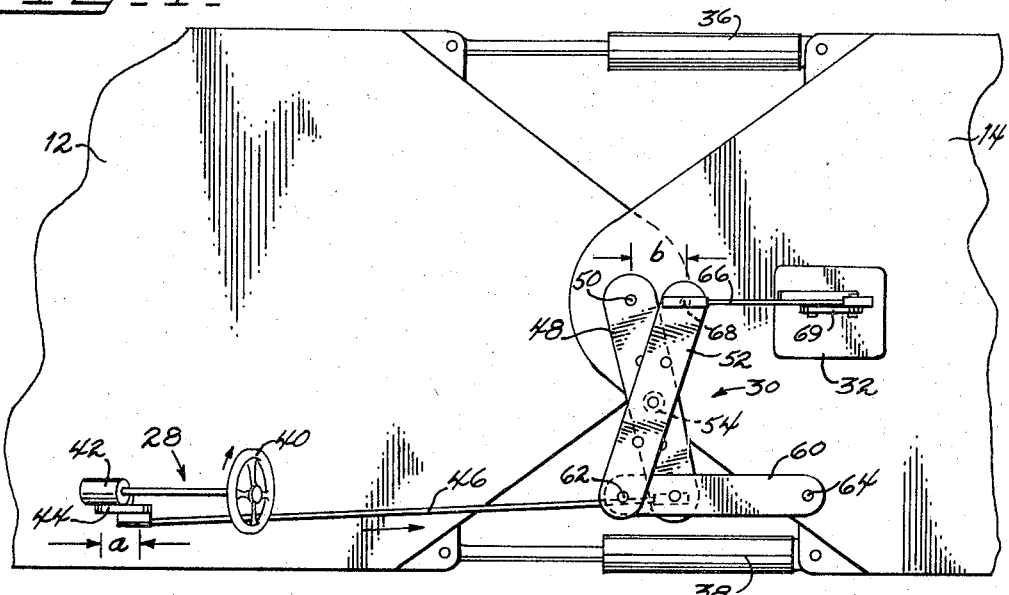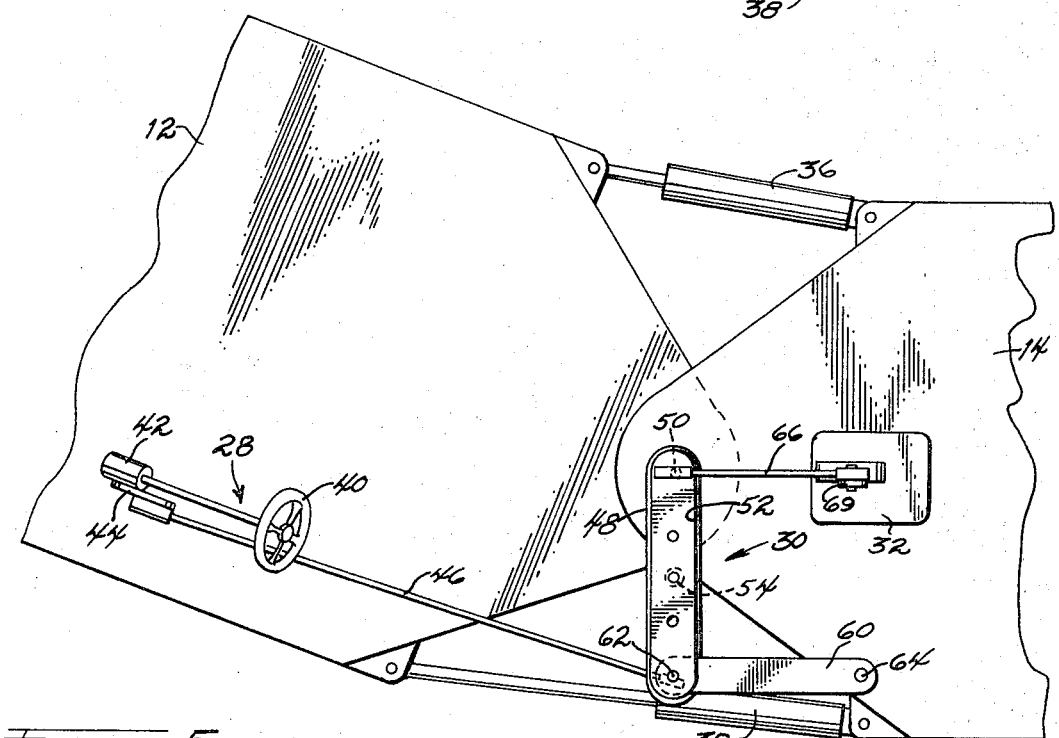

INVENTOR
MARCUS W. HAGEN
BY
ATT'Y.

United States Patent Office 3,312,301
Patented Apr. 4, 1967

3,312,301
ARTICULATED VEHICLE STEERING SYSTEM
Marcus W. Hagen, Kenosha, Wis., assignor to International Harvester Company, a corporation of Delaware
Filed Aug. 4, 1965, Ser. No. 477,219
12 Claims. (Cl. 180—79.2)

This invention relates to steering control systems for articulated vehicles and more particularly relates to steering control systems incorporating a linkage arrangement enabling steering signals to be relayed between the frame sections of an articulated vehicle.

In conventional construction vehicles of the articulated frame section design the operator's compartment is normally located on the front frame section to permit maximum visibility while the prime mover is located on the rear frame section. This design complicates the steering control system because with the steering wheel and steering control valve mounted together on the front section, and with the hydraulic pump in driving connection with the prime mover on the rear section, fluid conduits must be provided between the two sections to interconnect the control valve with the pump. The use of such conduits results in loss of power through friction and generation of excess heat. The conduits also are a source of potential failure in the steering system. Existing designs also require a separate follow-up mechanism to neutralize the control valve after the vehicle has undergone an initial steering movement. Furthermore, it is difficult to adapt such designs for various rates of response of the control valve to the steering signal or to the follow-up mechanism.

Accordingly, it is an object of this invention to provide a novel steering control system which will obviate the disadvantages inherent in existing steering control designs for articulated vehicles.

It is an object of this invention to eliminate the need for hydraulic steering control conduits between frame sections of an articulated vehicle by utilizing a lever arrangement to relay steering control signals from a manually operated steering mechanism on one frame section to hydraulic steering control means on the other frame section.

Another object is to provide a simple steering control system which will relay steering signals from one frame section of an articulated vehicle through a lever arrangement to the other frame section for actuating a hydraulic steering control device wherein the lever arrangement itself will supply the follow-up function to neutralize the control device after the frame sections have undergone an initial steering movement.

Another important object is to provide a steering control mechanism to relay steering signals from the operator's station on one section of an articulated vehicle to a hydraulic steering control device on the other section in which means are provided to selectively vary the response of the control device with respect to the magnitude of the steering signals.

Another object is to provide a steering control mechanism to transmit steering signals from the operator's station on one frame section of an articulated vehicle to a variable displacement steering pump on the other frame section wherein means are provided to change the rate at which the steering pump responds to a given steering signal.

Yet another object is to provide a steering control lever arrangement to transmit steering signals from the operator's station on one frame section of an articulated vehicle to a hydraulic steering control device on the other frame section in which means are provided to selectively vary the rate of the follow-up response for neutralization of the control device after the frame sections have undergone a steering movement.

The above and other objects are realized in accordance with the present invention by providing a steering control system in which a first lever pivots in response to steering signals from a manually operated steering wheel on one frame section, in which a second lever is pivotally attached to the first lever and operates in response to movement of the first lever to relay the signal to a hydraulic steering control device on the other frame section, and in which means are provided to vary the location of the pivot point between the two levers so that the rate of response of the control system may be selectively varied.

The invention, both as to its organization and method of operation, taken with further objects and advantages thereof, will best be understood by reference to the following description, taken in conjunction with the accompanying drawings, in which:

FIGURE 3 is a perspective view of the steering control system of the present invention in which the hydraulic control circuit is shown schematically;

FIGURE 4 is a top plan view of a portion of the vehicle as illustrated in FIGURE 2 showing an operating position of the steering control system;

FIGURE 5 is a top plan view similar to FIGURE 4 illustrating the follow-up function of the control system of this invention;

Figure 1:
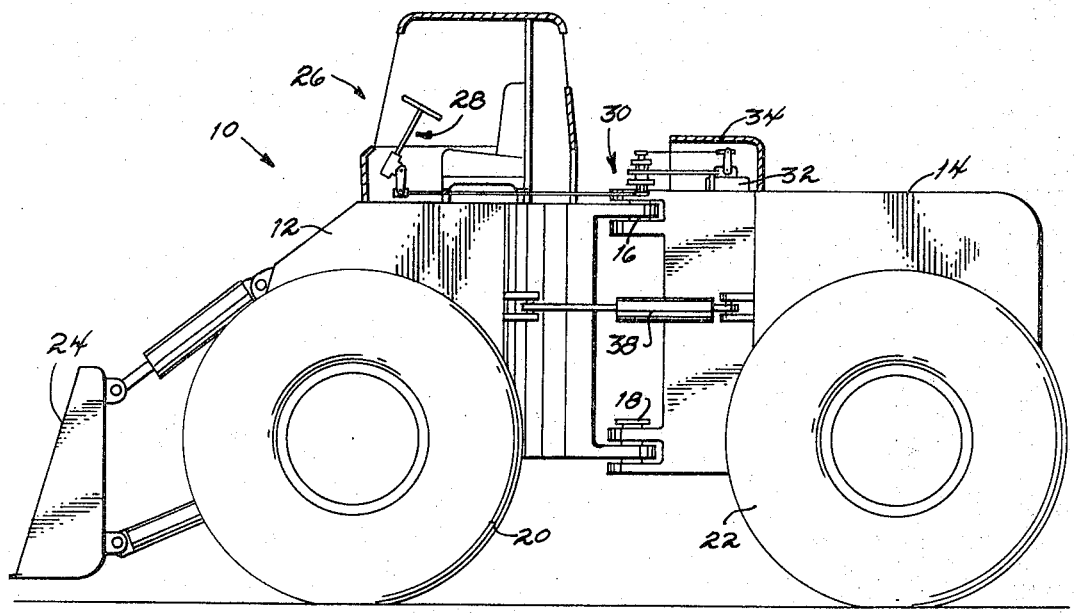
FIGURE 1 is a side elevational view, partially in cross section, of an articulated construction vehicle incorporating a steering system embodying features of the present invention.
Figure 2:
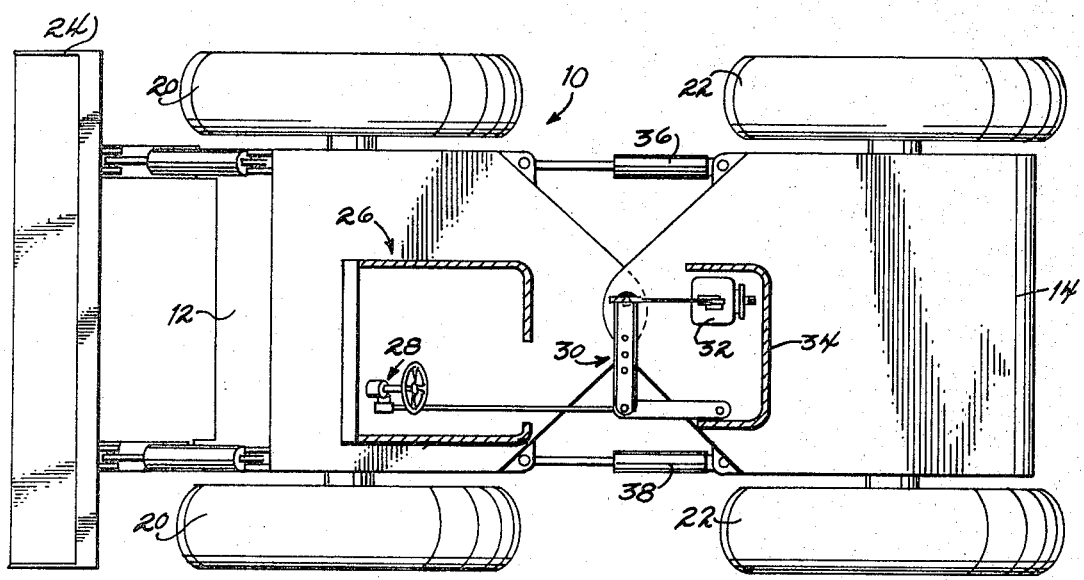
FIGURE 2 is a top plan view, partially in cross section, of the articulated vehicle of FIGURE 1 illustrating features of the present invention.

Referring now to the drawings and particularly FIGURES 1 and 2 a construction vehicle of the dozer type in shown generally at 10. The vehicle 10 comprises a front frame section 12 articulated to a rear frame section 14 about a substantially upright axis defined by the pivot pins 16 and 18. The front section 12 is supported by a pair of wheels 20 and the rear section 14 is supported by a pair of wheels 22 which in turn are driven by a power plant (not shown) such as an internal combustion engine mounted on the rear frame section. Any desired implement such as dozer blade 24 may be mounted on front section 12.

An operator's station 26 is carried on the upper side of front section 12 and includes a steering wheel assembly 28 which will presently be described in greater detail. A steering control linkage assembly 30 is mounted between the frame sections and is linked to hydraulic steering control device 32 mounted within the housing 34. A pair of hydraulic motors or extensible hydraulic rams 36 and 38 are positioned on opposite sides of the vehicle 10 and are pivotally connected between the front and rear frame sections. Operation of the rams 36 and 38 under influence of the control device 32 will pivot the front and rear frame sections about the pins 16 and 18 for right- and left-hand steering movements of the vehicle 10.

Turning now to FIGURE 3 the steering control system of the present invention is shown in greater detail. The manually operated steering wheel assembly 28 mounted on the front frame section 12 comprises a steering wheel 40 in driving connection with a conventional gear mechanism 42 which may be of the worm gear type. A Pitman arm 44 extends downwardly from the gear mechanism 42 and oscillates in a longitudinal plane in response to a turning movement of the steering wheel 40. A connecting link 46 is pivotally connected at one end to the free end of Pitman arm 44 and extends through the operator's station to the rear of front frame section 12. The link 46 reciprocates in response to oscillation of the Pitman arm to produce input steering signals. Movement of link 46 to the rear effects a "right-hand" steering signal whereas movement to the front effects a "left-hand" steering signal.

The steering control linkage assembly shown generally at 30 relays the steering signals from steering wheel assembly 28 to the hydraulic steering control device 32 mounted on the rear frame section 14. The assembly 30 comprises a first lever 48 which is pivotally connected at its one end to the rear end of connecting link 46 and at its other end to the rear section 14 by means of a pin 50 which is coaxial with the axis of articulation for the frame sections. A second lever 52 overlies lever 48 and is pivotally connected thereto by means of pivot pin 54. The first lever 48 has a plurality of spaced-apart apertures 56, 56′, and 56″ while the second lever 52 has a corresponding plurality of spaced-apart apertures 58, 58′ and 58″. As shown in FIGURES 2 and 5 the corresponding apertures of the levers are in registry when the steering control device 32 is in neutral and no steering signals are received from the link 46. The ends of pin 54 are provided with studs which are mounted in the middle pair of corresponding apertures 56 and 58. As will presently be brought out the pin 54 may also be mounted in either of the pairs of corresponding apertures 56′ and 58′ or 56″ and 58″ for varied rate of response of the steering control system.

A link 60 is pivotally connected at its one end to the outer end of second lever 52 by means of pivot pin 62 and at its other end to rear frame section 14 at a point spaced from the pin 50 by means of pivot pin 64. A connecting link 66 is pivotally connected at its one end to the free end of second lever 52 by means of pin 68 and at its other end to steering control device 32 by means of control arm 69.

The linkage assembly 30 transposes the input steering signals from link 46 into output steering signals in the form of reciprocating movements of link 66. The magnitude of the output signals will have a proportional relationship to the magnitude of the input signals depending on the location of pin 54 with respect to pin 50.

The steering control device 32 may be either an open-center spool valve type or a variable displacement pump type. Both types are broadly conventional and their construction and operation are well known to those skilled in the art. Suffice it to say that where either the open-center spool valve or the variable displacement pump is utilized as the control device 32 movement of link 66 and arm 69 will operate control device 32 to direct fluid under pressure through a selected one of the conduits 70 and 72 to the rams 36 and 38 for a steering movement of the frame sections.

The device 32 is constructed so that a rearward pivoting of arm 69 will direct fluid into conduit 70 while a forward pivoting will direct fluid into conduit 72. Conduit 70 is connected to the head end of ram 38 through branch conduit 74 and to the rod end of ram 36 through branch conduit 76. Similarly, conduit 72 is connected to the rod end of ram 38 through branch conduit 78 and to the head end of ram 36 through branch conduit 80. For a right-hand steering movement control device 32 will operate to direct fluid under pressure through conduit 70 and branch conduits 74 and 76 to retract ram 36 and extend ram 38. Return fluid will flow into branch conduits 78 and 80 and return to control device 32 through conduit 72. For a left-hand steering movement control device 32 will direct fluid through conduit 72 into branch conduits 78 and 80 to extend ram 36 and retract ram 38. Fluid will return from the rams through branch conduits 74 and 76 and conduit 70.

The rate of angular turning of the frame sections is proportional to the volume of fluid delivered to the steering rams 36 and 38. Where an open-center spool valve is used as the control device 32 fluid supplied from a pump (not shown) will be directed into the steering circuit with a volume proportional to the displacement of the spool, which in turn is dependent on the magnitude of the output signal from link 66 through the connection with control arm 69. Where the control device 32 is a variable displacement pump, such as a conventional swash-plate type, the prime mover will power the pump through a drive mechanism (not shown). The displacement of the pump is varied to direct a volume of fluid to the rams proportional to the angular movement of the arm 69 from the neutral position, which in turn is dependent on the magnitude of the output steering signal from link 66.

FIGURE 4 illustrates the position of the steering control linkage assembly 30 immediately after the operator has manipulated the steering wheel 40 clockwise a given amount for a right-hand steering movement of vehicle 10. The gear mechanism 42 will pivot the Pitman arm 44 to move the connecting link 46 rearwardly through the distance $a$ indicated in FIGURE 4. This produces the steering signal from the steering wheel assembly 28. Link 46 will pivot lever 48 about pin 50 and the movement of pin 54 with lever 48 will pivot lever 52 about pin 62. This action will move pin 68 and link 66 through the distance $b$ which has a predetermined ratio or proportion to distance $a$ depending upon the location of pivot pin 54. Link 66 in turn will pivot the upper end of arm 69 rearwardly through the distance $b$. Steering control device 32 will now operate in the manner described above to direct fluid under pressure to retract ram 36 and extend ram 38 for a right-hand steering movement.

In accordance with the present invention the steering control linkage assembly 30 also provides an automatic follow-up function so that the control device 32 is neutralized after the frame sections 12 and 14 have undergone an initial steering movement. This follow-up function provides a "steering feel" for the operator such that it is not necessary to return the steering wheel to the center position to terminate a steering movement. After the linkage assembly 30 is in the position shown in FIGURE 4 and the frame sections have started an initial right-hand steering movement, the steering wheel assembly 28 will maintain the link 46 and first lever 48 in a constant position relative to front frame section 12. As the rear section 14 pivots during the steering movement the link 60 will move rearwardly with respect to lever 48. This will cause second lever 52 to pivot counterclockwise relative to first lever 48 about pin 54. This pivoting will continue during the steering movement until link 66 moves forward through the distance $b$ to its original position with respect to pump 32. FIGURE 5 illustrates the linkage assembly configuration after link 66 has pivoted back to its original position. Link 66 in turn will pivot arm 69 to its neutral position thus terminating operation of control device 32 so that hydraulic fluid is no longer directed to the rams 36 and 38. Control device 32 will now remain neutralized until another steering signal is produced through operation of steering wheel assembly 28. The operation of the follow-up feature of this invention after a left-hand steering movement is similar to that described above for the right-hand steering movement.

The control system of the present invention is productive of a variable "rate of response," which is the mechanical ratio of an output signal, or movement $b$ of link 66, to an input signal, or movement $a$ of link 46. The ratio $b/a$ is determined by the position of pin 54.

With the control system assembled as illustrated in

Figure 6:
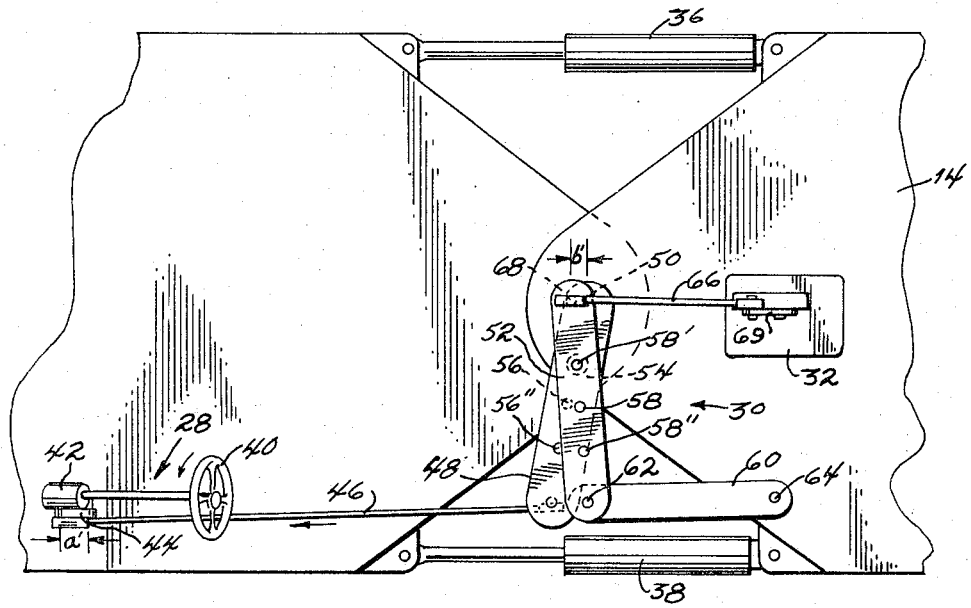
FIGURE 6 is a top plan view similar to FIGURE 4 with the steering control linkage assembly adjusted to produce a varied rate of response.

FIGURES 3–5 the ratio $b/a$ is approximately one, thereby producing a "normal rate of response." For a "high rate of response" the position of pin 54 is changed to that illustrated in FIGURE 6 in which the ratio $b/a$ is greater than one. For a "slow rate of response" the position of pin 54 is changed to that illustrated in FIGURE 7 in which the ratio $b/a$ is less than one. The importance to the operator in the variation in ratios lies in the amount of steering wheel movement required to initiate steering. With a "high rate of response" less steering wheel movement is required for steering as compared to a "slow rate of response." The former mode of steering would be useful in off-highway operations requiring frequent steering, while the latter mode would be useful in on-highway, high-speed travel to achieve driving safety and control.

As previously explained the position of pivot pin 54 may be selectively varied by assembling the pin between an appropriate pair of apertures 56–58, 56'–58', and 56"–58". Other means may also be provided to selectively vary the location of pivot pin 54 longitudinally along the levers 48 and 52. Thus, slots may be formed in the levers 48 and 52 in place of the apertures with means being provided to clamp or otherwise secure each end of pivot pin 54 in the selected position along the slots.

FIGURE 6 illustrates a steering control system in which the linkage assembly 30 has been assembled to produce a slow rate of response. Thus, the pivot pin 54 has been assembled between the pair of apertures closest to pins 50 and 68, i.e. aperture 58' on lever 52 and aperture 56' on lever 48. The linkage assembly will now effect a relatively small movement of link 66 for a given steering signal or movement of link 46 as compared to the normal steering arrangement of FIGURES 3 to 5. As an example assume that for a left-hand steering movement the steering wheel 40 is turned counterclockwise an amount equal to that described above in connection with FIGURE 4. The gear mechanism 42 will pivot Pitman arm 44 to move connecting link 46 forward through the distance $a'$. Link 46 will pivot lever 48 about pin 50; lever 48, acting through pivot pin 54, will pivot lever 52 forward. Link 66 will now move forward through the distance $b'$ to pivot arm 69 for operation of control device 32. It is apparent that the distance $b'$ is much less than the corresponding distance $b$ of FIGURE 4. Where either an open-center spool valve or variable displacement pump is provided as the control device 32 a relatively small volume of fluid will be directed to the rams 36 and 38 in response to the given steering input signal from the steering wheel assembly 28.

The alternate construction of the linkage assembly 30, as shown in FIGURE 6, will also produce a slower follow-up function to neutralize the control device 32. Thus, for a given angular displacement of the frame sections 12 and 14 the linkage assembly 30 will effect a shorter movement of link 66 to neutralize the control device 32 as compared to the normal steering arrangement.

Figure 7:
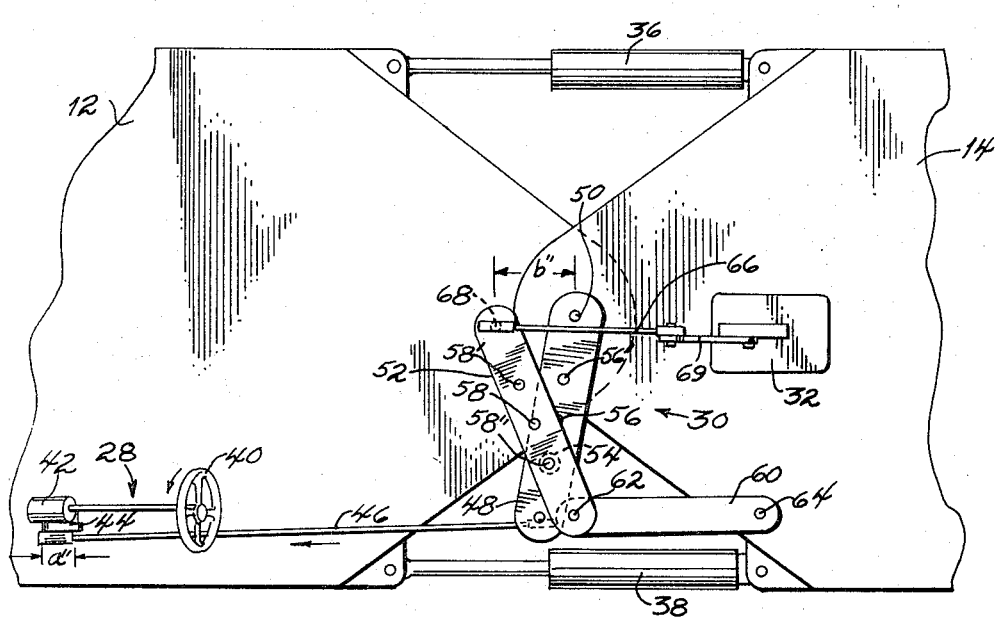
FIGURE 7 is a top plan view similar to FIGURE 4 in which the steering control linkage assembly is adjusted in still another configuration to produce a different rate of response.

FIGURE 7 illustrates another embodiment of the steering control linkage assembly 30 which produces a fast rate of response for the steering control system. In this assembly the pivot pin 54 is located at the extreme distance from the pivot pins 50 and 68, i.e. between apertures 58" on lever 52 and 56" on lever 48. Assuming that the operator manipulates the steering wheel 40 in a counterclockwise direction an amount equal to that described in connection with FIGURES 4 and 6, the gear mechanism 42 will pivot the Pitman arm 44 to produce an input signal with a forward movement of connecting link 46 through the distance $a''$. Link 46 will now pivot lever 48 about pin 50 which in turn will act through pin 54 to pivot lever 52 about pin 62. Link 66 will thus be carried by lever 52 through the distance $b''$ from the neutral position. Since the distance $b''$ is greater than the distance $b$ for normal steering, arm 69 will pivot through a greater arc to operate control device 32 and thereby direct a greater volume of fluid to the rams 36 and 38.

The embodiment of FIGURE 7 will also produce a higher rate of follow-up in the steering control system. Thus, after an initial steering movement when the frame sections 12 and 14 have undergone a given angular displacement the linkage assembly 30 will effect a greater movement of link 66 to neutralize the control device 32 as compared to the normal steering system of FIGURES 3 to 5.

While the explanation of the construction of the linkage assembly 30 to vary the sensitivity or rate of response of the steering control system has been explained in the context of the illustrated embodiments in which a series of pairs of apertures are provided along the levers 48 and 52, the operation of the steering system in which slots are provided in place of the apertures will be readily apparent to one skilled in the art. In such a construction the pivot pin 54 would be slidable along the slots between the desired positions on the levers. This will produce an infinitely variable rate of response between the extreme positions of the slots.

While several embodiments described herein are at present considered to be preferred, it is understood that various modifications and improvements may be made therein, and it is intended to cover in the appended claims all such modifications and improvements as fall within the true spirit and scope of the invention.

What I claim is:

1. In a steering control system for a vehicle having first and second frame sections articulated together about a substantially upright axis and having motor means to pivot the frame sections about the axis, the combination including: means on the first section to produce steering input signals having a selected magnitude; means between the frame sections operating responsive to the input signals to produce steering output signals having a magnitude proportional to the selected magnitude; control means on the second section operating responsive to the output signals to actuate the motor means at a rate proportional to the magnitude of the output signals.

2. In a steering control system for a vehicle having first and second frame sections articulated together about a substantially upright axis and having motor means to pivot the frame sections about the axis, the combination including: manually operated means on the first section to produce steering input signals having a selected magnitude; other means between the frame sections operating responsive to the input signals to produce steering output signals with a magnitude having a certain proportional relationship to the selected magnitude; control means on the second section operating responsive to the output signals to actuate the motor means for pivoting the frame sections; and additional means to vary the certain proportional relationship of the output signals to the input signals so that the rate of response of the control means to the manually operated means may be selectively varied.

3. In a steering control system for a vehicle having first and second frame sections articulated together about a substantially upright axis and having motor means to pivot the frame sections about the axis, the combination including: means on the first section to produce steering input signals having a selected magnitude; other means between the frame sections operating responsive to the input signals to produce steering output signals having a magnitude proportional to the selected magnitude; control means on the second section operating responsive to the output signals to actuate the motor means; and, the other means further operating to diminish the output signals in response to a pivotal movement of the frame sections.

4. In a steering control system for a vehicle having first and second frame sections articulated together about a substantially upright axis and having fluid actuated motor means to pivot the frame sections for steering movements, the combination including: manually operated means on the first section to produce steering signals; linkage means between the sections to relay the signals to the second frame section; other means on the second section operating responsive to the signals to direct hydraulic fluid to the motor means for actuation thereof; and, the linkage means further operating responsive to a steering movement of the frame sections to neutralize the other means whereby the fluid flow to the motor means is terminated.

5. In a steering control system for a vehicle having first and second frame sections articulated together about a substantially upright axis and having fluid actuated motor means to pivot the frame sections about the axis, the combination including: manually operated means on the first section to produce input signals having a selected magnitude in response to manual manipulation thereof; linkage means between the frame sections operating responsive to the input signals to produce output signals having a magnitude proportional to the selected magnitude; and pump means on the second section to direct fluid to the motor means in an amount proportional to the magnitude of the output signals.

6. In a steering control system for a vehicle having first and second frame sections articulated together about a substantially upright axis and having fluid actuated motor means to pivot the frame sections about the axis for steering movements thereof, the combination including: manually operated means on the first section to produce input signals having a selected magnitude; means between the frame sections to produce output signals responsive to the input signals, the output signals having a magnitude proportional to the selected magnitude; control valve means to direct hydraulic fluid to the motor means in an amount proportional to the magnitude of the output signals; other means to vary the proportion which the magnitude of the output signals has to the selected magnitude of the input signals; and, the means between the frame sections further operating to diminish the output signals in response to steering movements of the vehicle.

7. In a steering control system for a vehicle having first and second frame sections articulated together about an upright axis and having fluid actuated motor means for pivoting the frame sections about the axis, the combination including: manually operated steering means mounted on the first frame section to produce steering signals; linkage means mounted between the frame sections to relay the steering signals to the second frame section; fluid control means connected with the linkage means and mounted on the second frame section to direct fluid under pressure to the motor means in response to the steering signals for pivoting the frame sections; the linkage means further operating to neutralize the control means and discontinue fluid flow to the motor means in response to a pivoting movement of the frame sections.

8. In a steering control system for a construction vehicle having first and second frame sections articulated together about an upright axis and having motor means for pivoting the frame sections about the axis, the combination including: manually operated means mounted on the first frame section to produce steering signals; linkage means mounted between the frame sections to relay the steering signals to the second frame section; control means mounted on the second frame section to actuate the motor means in response to the steering signals; and other means to vary the rate at which the control means responds to the steering signals.

9. In a vehicle having first and second frame sections articulated together about a substantially upright axis and steered by means of hydraulic motors connected between the frame sections, a steering control mechanism for relaying steering input control signals from a manually operated steering assembly on the first section to the second section, the steering control mechanism comprising: first lever means mounted on the vehicle for pivotal movement about the axis in response to the input control signals; second lever means mounted on the first lever means and pivoting in response to movement of the first lever means to produce output control signals proportional to the input control signals, and steering control means to actuate the hydraulic motors in response to the output control signal.

10. In a vehicle having first and second frame sections articulated together about a substantially upright axis and steered by means of hydraulic motors connected between the frame sections, a steering control mechanism for relaying steering input control signals from a manually operated steering assembly on the first section to hydraulic steering control means on the second section for controlling the hydraulic motors, the steering control mechanism comprising: first lever means mounted on the vehicle for pivotal movement about the axis in response to the input control signals; second lever means operating in response to movement of the first lever means to produce output control signals proportional to the input control signals; and other means to pivotally interconnect the first and second lever means at selected positions intermediate their respective ends whereby the proportional relationship of the output control signals to the input control signals may be varied.

11. In a vehicle having first and second frame sections articulated together about an upright axis, a steering control mechanism for relaying steering control signals from a manually operated steering assembly on the first section to hydraulic steering control means on the second frame section, the mechanism comprising: a first lever pivotally connected at one end to the vehicle about the upright axis and at its other end to the steering assembly, a second lever operably connected at one end to the steering control means and pivotally connected at its other end to the first frame section at a point spaced from the axis, means to pivotally connect the first and second lever intermediate their respective ends, and means to selectively vary the point of connection of the first lever to the second lever to vary the rate of response of the steering control means to the control signals.

12. In a vehicle having first and second frame sections articulated together about an upright axis, a steering control mechanism for transmitting steering signals from a steering wheel assembly on the first section to a variable displacement hydraulic steering pump on the second section, the mechanism comprising the combination of: a first lever pivotally mounted at its one end to the vehicle about the axis and operably connected at its other end to the steering wheel assembly, the first lever having a plurality of spaced-apart apertures; a second lever overlying the first lever and operatively connected at its one end to the steering pump, the second lever having a plurality of spaced-apart apertures; a link connected between the other end of the second lever and the second frame section at a point spaced from the axis; and means pivotally connecting the second lever with the first lever between a selected pair of opposed apertures in the levers.

References Cited by the Examiner
UNITED STATES PATENTS

| | | | |
|---|---|---|---|
| 1,323,653 | 12/1919 | Stewart | 280—91 |
| 2,583,407 | 1/1952 | Binder | 60—52 |
| 3,159,230 | 12/1964 | Gordon | 180—79 |

BENJAMIN HERSH, *Primary Examiner.*

J. H. BRANNEN, *Assistant Examiner.*